(12) United States Patent
Gao et al.

(10) Patent No.: US 12,279,338 B2
(45) Date of Patent: Apr. 15, 2025

(54) INFORMATION OBTAINING METHOD AND APPARATUS, ELECTRONIC DEVICE, AND COMPUTER READABLE STORAGE MEDIUM

(71) Applicant: ZTE CORPORATION, Shenzhen (CN)

(72) Inventors: Minggang Gao, Shenzhen (CN); Qingyu Ni, Shenzhen (CN); Xuemei Ding, Shenzhen (CN); Mingye Wei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 449 days.

(21) Appl. No.: 17/907,701

(22) PCT Filed: Feb. 5, 2021

(86) PCT No.: PCT/CN2021/075504
§ 371 (c)(1),
(2) Date: Sep. 29, 2022

(87) PCT Pub. No.: WO2021/208572
PCT Pub. Date: Oct. 21, 2021

(65) Prior Publication Data
US 2023/0138503 A1    May 4, 2023

(30) Foreign Application Priority Data

Apr. 14, 2020  (CN) .......................... 202010289394.2

(51) Int. Cl.
*H04W 8/18*        (2009.01)
*H04W 68/00*     (2009.01)

(52) U.S. Cl.
CPC ........... *H04W 8/183* (2013.01); *H04W 68/00* (2013.01)

(58) Field of Classification Search
CPC ..... H04W 8/183; H04W 68/00; H04W 76/27; H04W 68/005; H04W 76/11; H04W 8/26
See application file for complete search history.

(56) References Cited

U.S. PATENT DOCUMENTS

| 8,738,021 B2 * | 5/2014 | Mutya ................... H04W 88/06 455/452.1 |
| 2019/0141594 A1 | 5/2019 | Jeong et al. |

FOREIGN PATENT DOCUMENTS

| CN | 105594250 A | 5/2016 |
| CN | 106686581 A | 5/2017 |

(Continued)

OTHER PUBLICATIONS

International Searching Authority. International Search Report and Written Opinion for PCT Application No. PCT/CN2021/075504 and English translation, mailed Apr. 27, 2021, pp. 1-9.

*Primary Examiner* — Kabir A Timory
(74) *Attorney, Agent, or Firm* — Vivacqua Crane, PLLC (57) ABSTRACT

Disclosed are an information acquisition method and apparatus, an electronic device, a terminal device, and a computer-readable storage medium. The information acquisition method may include: acquiring paging identifiers corresponding to M cards respectively from global unique temporary user equipment identities (GUTIs) allocated by networks corresponding to the M cards; wherein M is an integer greater than or equal to 2; and in response to determining that paging identifiers corresponding to N cards among the paging identifiers corresponding to the M cards are the same, selecting (N−1) cards from the N cards and triggering networks corresponding to the selected (N−1) cards to re-allocate GUTIs; wherein N is an integer greater than or equal to 2 and less than or equal to M.

15 Claims, 5 Drawing Sheets

(56) References Cited

FOREIGN PATENT DOCUMENTS

| CN | 110121203 A | 8/2019 |
| CN | 110536290 A | 12/2019 |

* cited by examiner

| MCC | MNC | AMF region ID | AMF set ID | AMF pointer | 5G-TMSI |
|---|---|---|---|---|---|
| 460 | 01 | 11111111 | 1111111111 | 111111 | 111111111111111111111111111111 |

Fig. 5 (a)

| MCC | MNC | AMF region ID | AMF set ID | AMF pointer | 5G-TMSI |
|---|---|---|---|---|---|
| 460 | 11 | 11111111 | 1111111111 | 111111 | 211111111111111111111111111111 |

Fig. 5 (b)

| AMF set ID | AMF pointer | 5G-TMSI |
|---|---|---|
| 1111111111 | 111111 | 111111111111111111111111111111 |

Fig. 5 (c)

| AMF set ID | AMF pointer | 5G-TMSI |
|---|---|---|
| 1111111111 | 111111 | 211111111111111111111111111111 |

Fig. 5 (d)

| MCC | MNC | AMF region ID | AMF set ID | AMF pointer | 5G-TMSI |
|---|---|---|---|---|---|
| 460 | 11 | 11111111 | 1111111111 | 111111 | 111111111111111111111111111111 |

Fig. 5 (e)

| AMF set ID | AMF pointer | 5G-TMSI |
|---|---|---|
| 1111111111 | 111111 | 111111111111111111111111111111 |

Fig. 5 (f)

| MCC | MNC | AMF region ID | AMF set ID | AMF pointer | 5G-TMSI |
|---|---|---|---|---|---|
| 460 | 01 | 11111111 | 1111111111 | 111111 | 33311111111111111111111111111111 |

Fig. 5 (g)

| AMF set ID | AMF pointer | 5G-TMSI |
|---|---|---|
| 1111111111 | 111111 | 33311111111111111111111111111111 |

INFORMATION OBTAINING METHOD AND APPARATUS, ELECTRONIC DEVICE, AND COMPUTER READABLE STORAGE MEDIUM

CROSS-REFERENCE TO RELATED APPLICATION

This application is a national stage filing under 35 U.S.C. § 371 of international application number PCT/CN2021/075504, filed Feb. 5, 2021, which claims priority to Chinese patent application No. 202010289394.2, filed Apr. 14, 2020. The contents of these applications are incorporated herein by reference in their entirety.

TECHNICAL FIELD

Embodiments of the present disclosure relate to the communications field, and more particularly, to an information acquisition method and apparatus, an electronic device, a terminal device, and a computer-readable storage medium.

BACKGROUND

Figure 1:
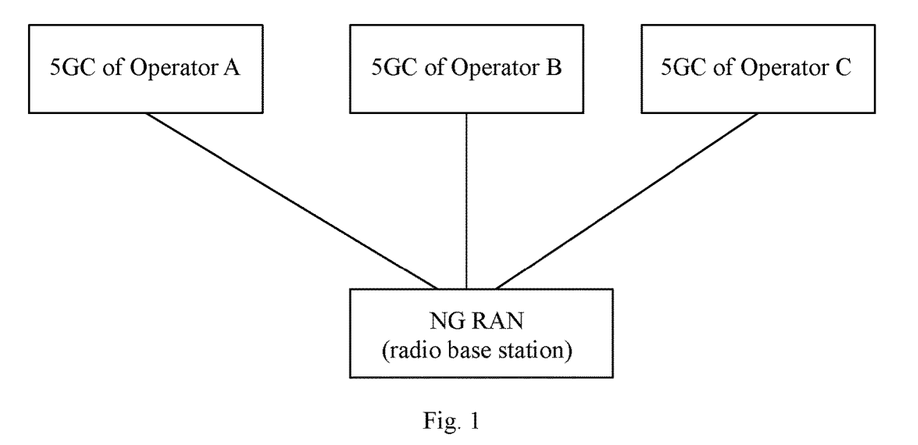
FIG. 1 is a schematic diagram of a 5G network sharing architecture provided by an existing technology.

With vigorous development of the 5th Generation (5G) mobile communications technology, new trends of network construction are emerging and thriving, a significant one of which is network co-construction for win-win cooperation. Since China Unicom and China Telecom have announced their 5G co-construction initiative, it is expected that more operators in the world will team up to jointly build 5G networks. As a network architecture strongly advocated by the 3rd generation partnership project (3GPP), 5G network co-construction is likely to be a major trend in the future from the perspective of costs and revenue of operators. An infrastructure of 5G Multi-Operator Core Network (5G MOCN) provided by 3GPP, as shown in FIG. 1, is exactly a use case where one radio base station can be shared by multiple operators. The operators can negotiate specific agreements on how to share resources of the base station. In this way, the operators' costs in construction of radio base stations are greatly reduced, and the 5G MOCN architecture proves to be a good model of an architecture for 5G win-win cooperation.

SUMMARY

An embodiment of the present disclosure provides an information acquisition method and apparatus, an electronic device, a terminal device, and a computer-readable storage medium.

In accordance with an aspect, an embodiment of the present disclosure provides an information acquisition method, which includes: acquiring paging identifiers corresponding to M cards respectively from global unique temporary user equipment identities (GUTIs) allocated by networks corresponding to the M cards; where M is an integer greater than or equal to 2; and in response to determining that paging identifiers corresponding to N cards among the paging identifiers corresponding to the M cards are the same, selecting (N−1) cards from the N cards and triggering networks corresponding to the selected (N−1) cards to re-allocate GUTIs; where N is an integer greater than or equal to 2 and less than or equal to M.

In accordance with an aspect, an embodiment of the present disclosure provides an electronic device, which includes: at least one processor; and a memory storing at least one program which, when executed by the at least one processor, causes the at least one processor to carry out any information acquisition method described above.

In accordance with an aspect, an embodiment of the present disclosure provides a terminal device, which includes: at least two card slots for accommodating cards; at least one processor; and a storage device storing at least one program which, when executed by the at least one processor, causes the at least one processor to carry out any information acquisition method described above.

In accordance with an aspect, an embodiment of the present disclosure provides a computer-readable storage medium storing a computer program which, when executed by a processor, causes the processor to carry out any information acquisition method described above.

BRIEF DESCRIPTION OF DRAWINGS

The accompanying drawings are used to facilitate further understanding of the embodiments of the present disclosure and constitute a part of the description. The accompanying drawings are intended to explain the present disclosure together with the embodiments of the present disclosure, and do not constitute a restriction on the present disclosure. The above and other features and advantages will become more apparent to those having ordinary skill in the art from description of detailed and illustrative embodiments with reference to the accompanying drawings.

DETAILED DESCRIPTION

In order to make those having ordinary skill in the art better understand the technical scheme of the present disclosure, an information acquisition method and apparatus, an electronic device, a terminal device, and a computer-readable storage medium provided by the present disclosure are described in detail below with reference to the accompanying drawings.

Embodiments will be described in detail below with reference to the accompanying drawings but the example embodiments may be embodied in different forms and should not be interpreted as being limited to the embodiments set forth in this specification. These embodiments are provided to make the present disclosure thorough and complete and therefore make those having ordinary skill in the art fully understand the scope of the present disclosure. Embodiments of the present disclosure and features in the embodiments may be combined with each other in a non-conflicting manner.

As used in this specification, the term "and/or" includes any and all combinations of at least one related items listed.

Terms used in this specification are used only to describe embodiments and are not intended to limit the present disclosure. As used in this specification, singular forms "a/an" and "the" are also intended to include plural forms, unless clearly indicated otherwise. It should be further understood that the terms "comprise" and/or "include", when used in this specification, indicate presence of features, entities, steps, operations, elements and/or components, but do not exclude presence or addition of at least one further feature, entity, step, operation, element, component and/or group.

Unless otherwise limited, all terms used in this specification (including technical and scientific terms) have the same meaning as would generally be understood by those of ordinary skill in the art. It should be further understood that terms defined in common dictionaries should be construed as having meanings consistent with their meanings in the context of the existing technology and the present disclosure, and will not be construed as having idealized or over-formal meanings unless expressly so defined in this specification.

For a 5G network sharing architecture shown in FIG. 1, a potential risk warning is given in 3GPP TS 38.501, that is, once a radio base station is shared by core networks of a plurality of operators, there is a possibility that the same 5G-S-TMSI will be used by different operators at the same time. Although the 3GPP considers that the probability is quite low, the risk does exist.

The causes and consequences of a collision between different operators caused by the 5G-S-TMSI are described below.

Firstly, the causes of the collision between different operators caused by the 5G-S-TMSI are analyzed here. A network element with the strongest correlation with a terminal device in the 5G core network is an Access and Mobility Management Function (AMF) network element, which is responsible for allocating 5G-GUTIs to terminal devices. A 5G-GUTI is globally unique without duplication because the 5G-GUTI includes Public Land Mobile Network (PLMN) information of an operator, which includes a Mobile Country Code (MCC) and a Mobile Network Code (MNC). However, the 5G-GUTI is used in a Non-Access Stratum (NAS) message for interaction between the terminal devices and the core network. Once a NAS signaling connection and a Radio Resource Control (RRC) connection are released, the network can no longer use the 5G-GUTI to identify a terminal device, but may use a 5G-S-TMSI to identify the terminal device. A main idea of this design is that 5G-S-TMSI, as a subset of 5G-GUTI, is shorter in length and can therefore reduce an overhead of signaling bytes. Further, as the main idea of 5G-GUTI comes from GUTI in the 4th generation (4G), 5G encounters the problem brought by network sharing which is not considered in the 4G era.

Figure 2:
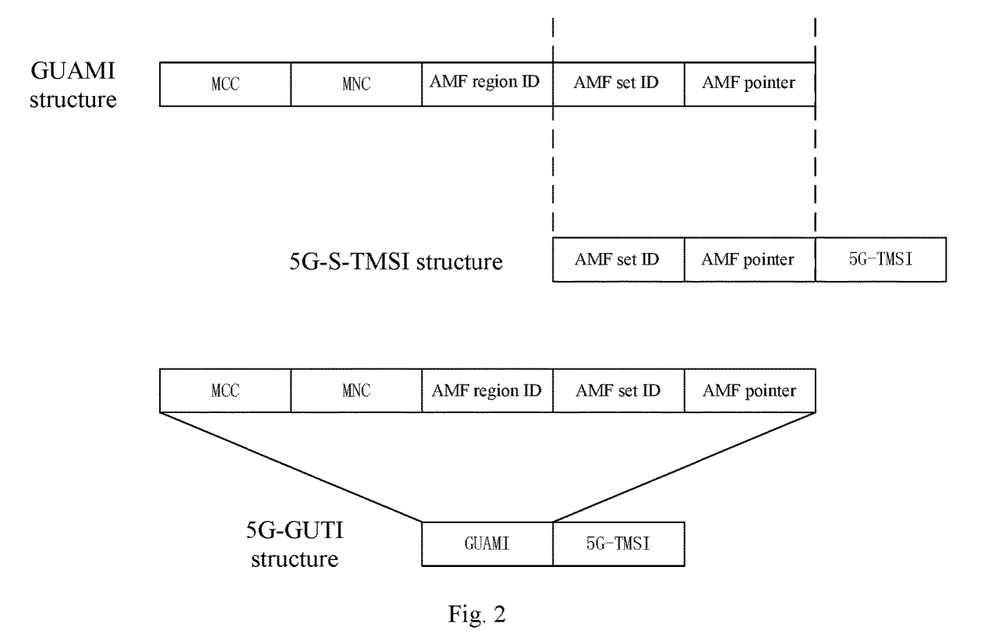
FIG. 2 is a schematic diagram of structures of a 5G S-Temporary Mobile Subscriber Identity (5G-S-TMSI) and a 5G Global Unique Temporary UE Identity (5G-GUTI) provided by an existing technology.

As shown in FIG. 2, a 5G-GUTI includes a Globally Unique AMF ID (GUAMI) and a 5G-TMSI, where the GUAMI includes an MCC, an MNC, an AMF Region Identifier (AMF Region ID), an AMF Set Identifier (AMF Set ID), and an AMF Pointer.

With an MCC, an MNC, and an AMF Region ID of 5G-GUTI excluded, the 5G-S-TMSI lacks information such as a geographical location of a core network of an operator and attribution to the operator. Therefore, it is possible that a 5G-S-TMSI is assigned to the same value by different operators.

Secondly, the consequences of the collision between different operators caused by 5G-S-TMSI are analyzed. It is assumed that a base station A is shared by core networks of China Telecom and China Unicom, but for some reason, there is a deviation in network design, which leads to a same 5G-S-TMSI being allocated to mobile phones of users X and Y. In other words, mobile phone numbers of the user X and the user Y are mapped to the same 5G-S-TMSI. Then, when the user X is called by a user Z, there are the following two scenarios:

Scenario 1: The user X and the user Y are users of two different mobile phones. Assuming the user Z calls the user X from another place at this time, both the mobile phones of the user X and the user Y would ring, as both of the phones deem that the paging is directed to themselves. As a result, the user Y would receive a phone call that should not be received.

Scenario 2: The user X and the user Y are users of a dual-card mobile phone (with both a card of China Unicom and a card of China Telecom inserted). It is possible that these two cards are allocated the same 5G-S-TMSI when registering with base station A. In this case, if the user Z calls the user X, the user Y of the dual-card mobile phone shared with the user X is also called at the same time, and it is possible that the phone line is busy or the two cards receive a call from the same user at the same time.

Such situations would not arise in the 4G mobile communication technology, because one base station corresponds to one operator in the 4G era, avoiding any confusion. However, such situations may occur in the 5G era, causing a severe result, although with a low probability.

A suggestion given by the 3GPP is that operators should avoid such collision during core network planning and deployment, and further seek solutions from other aspects to resolve the 5G-S-TMSI collision during core network deployment by the operators.

Scenario 1 is more dependent on a network side to resolve the problem, and details will not be described herein. Scenario 2 can be avoided from the perspective of the terminal device. The embodiments of the present disclosure will resolve the problem in Scenario 2 from the perspective of a dual-card terminal device or a multi-card terminal device.

Although the embodiments of the present disclosure are proposed based on problems existing in 5G, the embodiments of the present disclosure are also applicable to other communication systems with base station sharing, such as 4G, or a future mobile communications system, for example, 6G, 7G, etc.

In addition, in order to adapt to future mobile communications technologies, for example, development of 6G and 7G, in the embodiments of the present disclosure, 5G-GUTI in 5G and corresponding identifiers in other communication systems are collectively referred to as GUTI, and 5G-S-TMSI in 5G and corresponding identities in other communication systems are collectively referred to as a paging identifier. In other words, a paging identifier refers to an identifier that can be used to identify a terminal device when the terminal device is called (that is, being paged) after entering an idle state. After the network uses a paging identifier to page the terminal device, the terminal device determines, by verifying the paging identifier delivered by the network, whether the network is paging the terminal device.

Figure 3:
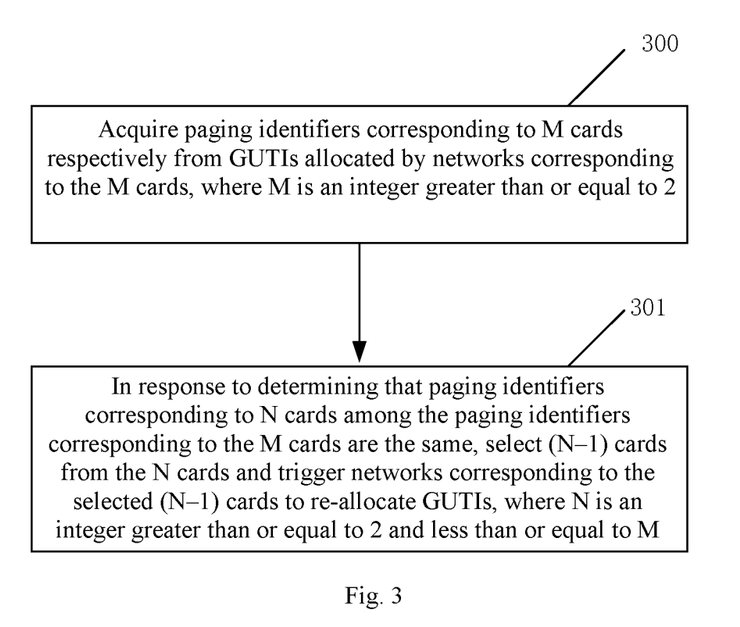
FIG. 3 is a flowchart of an information acquisition method provided by an embodiment of the present disclosure.

FIG. 3 is a flowchart of an information acquisition method provided by an embodiment of the present disclosure.

In accordance with an aspect, referring to FIG. 3, an embodiment of the present disclosure provides an information acquisition method, including the following steps.

At step 300, paging identifiers corresponding to M cards are acquired respectively from GUTIs allocated by networks corresponding to the M cards, where M is an integer greater than or equal to 2.

In some illustrative embodiments, acquiring paging identifiers corresponding to M cards respectively from GUTIs allocated by networks corresponding to the M cards means that: for each card, a paging identifier corresponding to the card is acquired from a GUTI allocated by the network corresponding to the card. In other words, the GUTI allocated by the network corresponding to the card with an MCC, an MNC, an MNC, and an AMF Region ID removed is the paging identifier corresponding to the card.

In some illustrative embodiments, a network corresponding to the card refers to a network registered by the card.

At step 301, in response to determining that paging identifiers corresponding to N cards among the paging identifiers corresponding to the M cards are the same, (N−1) cards are selected from the N cards and networks corresponding to the selected (N−1) cards are triggered to re-allocate GUTIs; where N is an integer greater than or equal to 2 and less than or equal to M.

In some illustrative embodiments, re-allocation of GUTI may be triggered in a manner of initiating a re-registration process, initiating a handover process, or initiating signaling related to mobility management to trigger the network to update the GUTI, or in other triggering manners. A triggering manner is not intended to limit the protection scope of the embodiment of the present disclosure, and details will not be repeated herein.

In some other illustrative embodiments, in response to determining paging identifiers corresponding to any two cards among the paging identifiers corresponding to the M cards are different from each other, the process ends.

According to the information acquisition method provided by the embodiment of the present disclosure, in response to determining that paging identifiers corresponding to N cards among the paging identifiers corresponding to the M cards are the same, (N−1) cards are selected from the N cards and networks corresponding to the selected (N−1) cards are triggered to re-allocate GUTIs. Since re-allocated GUTIs are very likely to differ from the previously allocated GUTIs, re-acquired paging identifiers are also very likely to differ from the previously acquired paging identifiers. This can reduce a possibility of a collision between paging identifiers corresponding to any two cards in the paging identifiers corresponding to M cards.

In some illustrative embodiments, after the network corresponding to the (N−1) cards is triggered to re-allocate GUTIs, the method further includes:

continuing the step of acquiring paging identifiers corresponding to M cards respectively from GUTIs allocated by networks corresponding to the M cards, until paging identifiers corresponding to any two cards among the paging identifiers corresponding to the M cards are different from each other.

The embodiment of the present disclosure continuously triggers the re-allocation of GUTIs, until paging identifiers corresponding to any two cards among the paging identifiers corresponding to the M cards are different from each other, thereby avoiding a collision between the paging identifiers.

In some illustrative embodiments, it is first determined whether the M cards are camped on one and the same cell and whether the cell is shared by operators corresponding to the M cards. In response to determining that the M cards are camped on one and the same cell, which is shared by the operators corresponding to the M cards, paging identifiers corresponding to M cards are respectively acquired from GUTIs allocated by networks corresponding to the M cards.

In response to determining that the M cards are not camped on one and the same cell or the cell is not shared by the operators corresponding to the M cards, the process ends.

In some other illustrative embodiments, there may be no need to determine whether the M cards are camped on one and the same cell and whether the cell is shared by operators corresponding to the M cards, and paging identifiers corresponding to M cards are respectively acquired from GUTIs allocated by networks corresponding to the M cards directly.

In some illustrative embodiments, it may be determined, according to a network broadcast message of the base station, whether the M cards are camped on one and the same cell and whether the cell is shared by the operators corresponding to the M cards. For example, when the network broadcast message includes a Cell Identifier (CI), if a specific card camps on the cell, the card will receive the CI. Then, it can be determined, according to CIs of the M cards, whether the M cards are camped on one and the same cell. In some embodiments, the same CGI of the M cards indicates that the M cards are camped on one and the same cell. When the network broadcast message includes a PLMN list including PLMNs (the PLMN includes an MCC and an MNC) of all operators sharing the base station, it may be determined, according to MNCs in the PLMN list, whether a cell is shared by the operators corresponding to the M cards. In some embodiments, when the MNCs in the PLMN list indicate the operators corresponding to the M cards, it is indicated that the cell is shared by the operators corresponding to the M cards.

According to the embodiment of the present disclosure, by first determining whether the M cards are camped on one and the same cell and whether the cell is shared by the operators corresponding to the M cards, unnecessary operation procedures can be reduced.

In some illustrative embodiments, selecting (N−1) cards from the N cards includes: selecting (N−1) cards from the N cards according to service statuses of the N cards.

In some illustrative embodiments, selecting (N−1) cards from the N cards according to service statuses of the N cards includes:

in response to determining that all the N cards are in a service idle state or all the N cards are processing a non-real-time service, randomly selecting (N−1) cards from the N cards.

In some other illustrative embodiments, selecting (N−1) cards from the N cards according to service statuses of the N cards includes:

in response to determining that one of the N cards is performing a real-time service, selecting, from the N cards, (N−1) cards except the card which is performing the real-time service.

In some other illustrative embodiments, selecting (N−1) cards from the N cards according to service statuses of the N cards includes:

in response to determining that one of the N cards is in a non-service idle state and the remaining (N−1) cards are in a service idle state, selecting the (N−1) cards in the service idle state from the N cards.

In some illustrative embodiments, a non-real-time service may refer to an Internet service.

In some illustrative embodiments, a real-time service may refer to a phone call service, a real-time video communication service, or a real-time audio communication service.

Certainly, there may be other selection strategies, such as randomly selecting (N−1) cards without making any judgment. A specific selection strategy is not used to limit the protection scope of the embodiment of the present disclosure and will not be described herein.

In the embodiment of the present disclosure, re-allocation of GUTI is triggered while interruption to critical services (such as telephone service) of a user is avoided as far as possible, so that the problem of a collision between paging identifiers can be solved for the user in a perception-free way, improving user experience.

An implementation process of a method for acquiring a paging identifier of the embodiment of the present disclosure will be described in detail below by an example, which is only for illustrative convenience and cannot be used to limit the protection scope of the embodiment of the present disclosure.

Example

It is assumed that a user has a 5G dual-card mobile phone, with a Universal Subscriber Identity Module (USIM) card of China Unicom (referred to as card 1 below) and a USIM card of China Telecom (referred to as card 2 below) inserted therein, and the terminal device at this time is handed over to a shared 5G base station A in a mobile process. It is assumed that the shared 5G base station A is jointly built and shared by China Unicom and China Telecom. At this time, the shared 5G base station A informs the terminal device through a network broadcast message that the base station is currently shared by two operators, China Unicom and China Telecom, and broadcasts a PLMN list, which contains a PLMN of China Unicom: 46001 (MCC is 460, and MNC is 01), and a PLMN of China Telecom: 46011 (MCC is 460, and MNC is 11).

Figure 4:
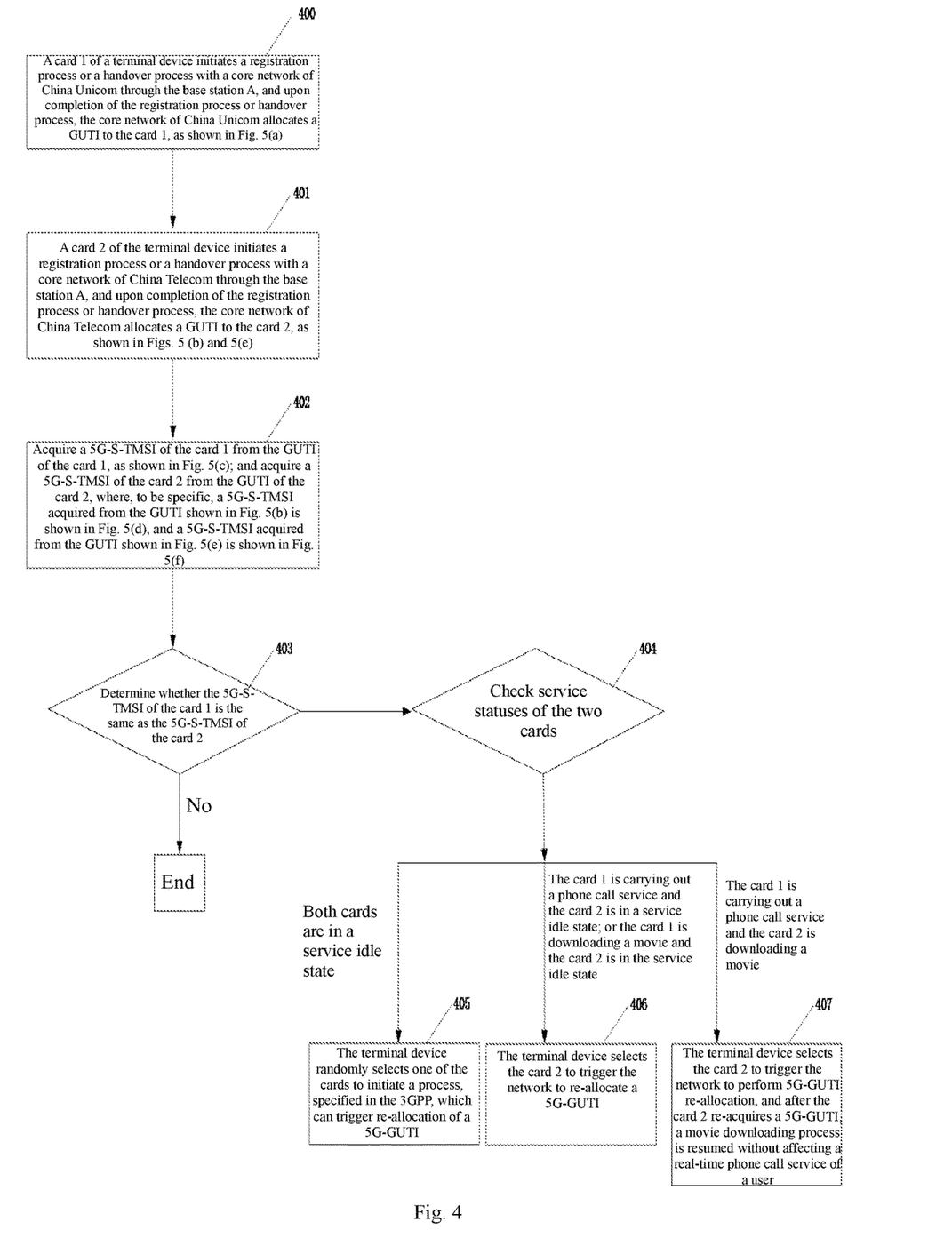
FIG. 4 is a flowchart of an information acquisition method provided by an example of an embodiment of the present disclosure.

FIG. 4 is a flowchart of an information acquisition method according to the example. Referring to FIG. 4, the method includes the following steps.

Figure 5:
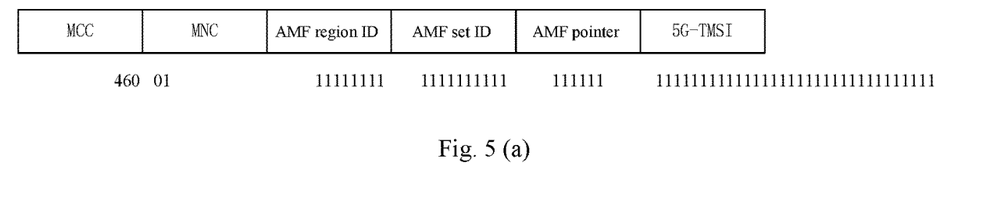
FIG. 5(a) is a schematic diagram of a GUTI allocated by a core network of China Unicom for card 1 according to an example of an embodiment of the present disclosure.
FIG. 5(b) is a first schematic diagram of a GUTI allocated by a core network of China Telecom for card 2 according to an example of an embodiment of the present disclosure.
FIG. 5(c) is a schematic diagram of a 5G-S-TMSI of card 1 acquired from the GUTI of FIG. 5(a) according to an example of an embodiment of the present disclosure.
FIG. 5(d) is a first schematic diagram of a 5G-S-TMSI of card 2 acquired from the GUTI of FIG. 5(b) according to an example of an embodiment of the present disclosure.
FIG. 5(e) is a second schematic diagram of a GUTI allocated by a core network of China Telecom for card 2 according to an example of an embodiment of the present disclosure.
FIG. 5(f) is a second schematic diagram of a 5G-S-TMSI of card 2 acquired from the GUTI of FIG. 5(e) according to an example of an embodiment of the present disclosure.
FIG. 5(g) is a schematic diagram of a GUTI re-allocated by a core network of China Unicom for card 1 according to an example of an embodiment of the present disclosure.
FIG. 5(h) is a schematic diagram of a 5G-S-TMSI of card 1 acquired from the GUTI of FIG. 5(g) according to an example of an embodiment of the present disclosure.

At step 400, a card 1 of a terminal device initiates a registration process or a handover process with a core network of China Unicom through the base station A, and upon completion of the registration or handover process, the core network of China Unicom allocates a GUTI to the card 1, as shown in FIG. 5(a).

At step 401, a card 2 of the terminal device initiates a registration process or a handover process with a core network of China Telecom through the base station A, and upon completion of the registration or handover process, the core network of China Telecom allocates a GUTI to the card 2, as shown in FIGS. 5(b) and 5(e).

At step 402, a 5G-S-TMSI of the card 1 is acquired from the GUTI of the card 1, as shown in FIG. 5(c); and a 5G-S-TMSI of the card 2 is acquired from the GUTI of the card 2, to be specific, a 5G-S-TMSI acquired from the GUTI shown in FIG. 5(b) is shown in FIG. 5(d), and a 5G-S-TMSI acquired from the GUTI shown in FIG. 5(e) is shown in FIG. 5(f).

At step 403, it is determined whether the 5G-S-TMSI of the card 1 is the same as the 5G-S-TMSI of the card 2, and the process is ended in response to determining that the 5G-S-TMSI of the card 1 is different from the 5G-S-TMSI of the card 2. In response to determining that the 5G-S-TMSI of the card 1 is the same as the 5G-S-TMSI of the card 2, the process proceeds to step 404.

For example, it can be seen from FIGS. 5(c) and 5(d) that the 5G-S-TMSI of the card 1 is different from the 5G-S-TMSI of the card 2, while it can be seen from FIGS. 5(c) and 5(f) that the 5G-S-TMSI of the card 1 is the same as the 5G-S-TMSI of the card 2.

At step 404, the terminal device checks service statuses of the two cards, and continues to execute step 405 in response to determining that the two cards have not carried out any phone call service or Internet service, that is, both cards are in a service idle state. In response to determining that the card 1 is carrying out a phone call service and the card 2 is in a service idle state, the terminal device proceeds to execute step 406. In response to determining that the card 1 is carrying out a phone call service and the card 2 is downloading a movie, the terminal device proceeds to execute step 407. In response to determining that the card 1 is downloading a movie and the card 2 is in a service idle state, the terminal device proceeds to execute step 406.

At step 405, the terminal device randomly selects one of the cards to initiate a process, specified in the 3GPP, which can trigger 5G-GUTI re-allocation (for example, to initiate a re-registration process, or initiate signaling related to mobility management to trigger the network to update the 5G-GUTI).

For example, the card 1 initiates a re-registration process with the core network of China Unicom, and a re-allocated 5G-GUTI is shown in FIG. 5(g) (since a network architecture has not changed, only the part of randomly allocated 5G-TMSI part has changed).

A 5G-S-TMSI acquired from the GUTI of the card 1 in FIG. 5(g) is shown in FIG. 5(h). It can be seen from FIG. 5(f) and FIG. 5(h) that the 5G-S-TMSI of card 1 at this time is different from the 5G-S-TMSI of the card 2.

At step 406, the terminal device selects the card 2 to trigger the network to re-allocate a 5G-GUTI.

At step 407, the terminal device selects the card 2 to trigger the network to re-allocate a 5G-GUTI. After the card 2 re-acquires a 5G-GUTI, a movie downloading process is resumed without affecting a real-time phone call service of the user.

In accordance with an aspect, an embodiment of the present disclosure provides an electronic device, including:
at least one processor; and a storage device storing at least one program which, when executed by the at least one processor, causes the at least one processor to carry out any information acquisition method described above.

Here, the processor is a device having a data processing capability, which includes but is not limited to a central processing unit (CPU), or the like. The storage device is a device having a data storage capability, which includes but is not limited to random access memory (RAM, more specifically an SDRAM, a DDR, etc.), a read-only memory (ROM), an electrically erasable programmable read-only memory (EEPROM), a flash memory (FLASH).

In some embodiments, the processor and the storage device are connected to each other through a bus, and are further connected to other components of a computing device.

In accordance with an aspect, an embodiment of the present disclosure provides a terminal, including: at least two card slots for accommodating cards; at least one processor; and a storage device storing at least one program which, when executed by the at least one processor, causes the at least one processor to carry out any information acquisition method described above.

In accordance with an aspect, an embodiment of the present disclosure provides a computer-readable storage medium storing a computer program which, when executed by a processor, causes the processor to carry out any information acquisition method described above.

Figure 6:
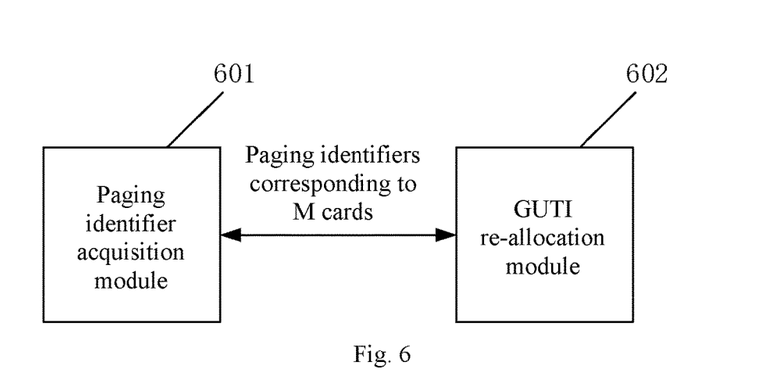
FIG. 6 is a block diagram of an information acquisition apparatus provided by an embodiment of the present disclosure.

FIG. 6 is a block diagram of an information acquisition apparatus according to an embodiment of the present disclosure.

In accordance with an aspect, referring to FIG. 6, an embodiment of the present disclosure provides an information acquisition apparatus including:

a paging identifier acquisition module 601 configured to respectively acquire paging identifiers corresponding to M cards respectively from GUTIs allocated by networks corresponding to the M cards, where M is an integer greater than or equal to 2; and a GUTI re-allocation module 602 configured to: in response to determining that paging identifiers corresponding to N cards among the paging identifiers corresponding to the M cards are the same, select (N−1) cards from the N cards and trigger networks corresponding to the selected (N−1) cards to re-allocate GUTIs, where N is an integer greater than or equal to 2 and less than or equal to M.

In some illustrative embodiments, after the GUTI re-allocation module 602 executes the step of triggering networks corresponding to the selected (N−1) cards to re-allocate GUTIs, the paging identifier acquisition module 601 is further configured to:

continuing the step of acquiring paging identifiers corresponding to M cards respectively from GUTIs allocated by networks corresponding to the M cards, until paging identifiers corresponding to any two cards among the paging identifiers corresponding to the M cards are different from each other.

In some illustrative embodiments, the paging identifier acquisition module 601 is further configured to:

in response to determining that the M cards are camped on one and the same cell, which is shared by operators corresponding to the M cards, continue the step of acquiring paging identifiers corresponding to M cards respectively from GUTIs allocated by networks corresponding to the M cards.

In some illustrative embodiments, the GUTI re-allocation module 602 is configured to carry out the selection of (N−1) cards from the N cards in the following manner:

selecting (N−1) cards from the N cards according to service statuses of the N cards.

In some illustrative embodiments, the GUTI re-allocation module 602 is configured to carry out the selection of (N−1) cards from the N cards according to service statuses of the N cards in the following manner:

in response to determining that all the N cards are in a service idle state or all the N cards are processing a non-real-time service, randomly selecting (N−1) cards from the N cards.

In some illustrative embodiments, the GUTI re-allocation module 602 is specifically configured to carry out the selection of (N−1) cards from the N cards according to service statuses of the N cards in the following manner:

in response to determining that one of the N cards is performing a real-time service, selecting, from the N cards, (N−1) cards except the card which is performing the real-time service.

In some illustrative embodiments, the GUTI re-allocation module 602 is configured to carry out the selection of (N−1) cards from the N cards according to service statuses of the N cards in the following manner:

in response to determining that one of the N cards is in a non-service idle state and the remaining (N−1) cards are in a service idle state, selecting the (N−1) cards in the service idle state from the N cards.

An implementation process of the information acquisition apparatus is the same as that of the information acquisition method of the above embodiment, and details will not be repeated herein.

It can be understood by those having ordinary skill in the art that all or some of the steps of the methods, systems and functional modules/units in the devices disclosed above can be implemented as software, firmware, hardware and appropriate combinations thereof. In a hardware embodiment, the division between functional modules/units mentioned in the above description does not necessarily correspond to the division of physical components; for example, a physical component may have multiple functions, or a function or step may be performed cooperatively by several physical components. Some or all of the physical components may be implemented as software executed by a processor, such as a central processing unit, a digital signal processor or a microprocessor, or as hardware, or as an integrated circuit, such as an application-specific integrated circuit. Such software can be distributed on computer-readable media, which can include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable instructions, data structures, program modules or other data. A computer-readable storage medium includes, but is not limited to, RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and can include any information transmission media.

Illustrative embodiments have been disclosed in this specification in which specific terms are used, but they are only used and should only be interpreted in a general illustrative sense and are not intended to impose limitation. In some examples, it is apparent to those having ordinary skill in the art that, unless otherwise expressly specified, characteristics, features and/or elements described in particular embodiments may be used alone or used in combination with characteristics, features and/or elements described in other embodiments. Therefore, those having ordinary skill in the art should understand that various changes in forms and details may be made without departing from the scope of the present disclosure as set forth by the appended claims.

The invention claimed is:

1. An information acquisition method, comprising:
   acquiring paging identifiers corresponding to M cards respectively from global unique temporary user equipment identities (GUTIs) allocated by networks corresponding to the M cards;
   wherein M is an integer greater than or equal to 2; and
   in response to determining that paging identifiers corresponding to N cards among the paging identifiers corresponding to the M cards are the same, selecting (N−1) cards from the N cards and triggering networks corresponding to the selected (N−1) cards to re-allocate GUTIs;
   wherein N is an integer greater than or equal to 2 and less than or equal to M.

2. The method of claim 1, after triggering networks corresponding to the selected (N−1) cards to re-allocate GUTIs, the method further comprising:
   continuing the step of acquiring paging identifiers corresponding to M cards respectively from GUTIs allocated by networks corresponding to the M cards, until paging identifiers corresponding to any two cards among the paging identifiers corresponding to the M cards are different from each other.

3. The method of claim 1, further comprising:
   in response to determining that the M cards are camped on one and the same cell which is shared by operators corresponding to the M cards, continuing the step of acquiring paging identifiers corresponding to M cards respectively from GUTIs allocated by networks corresponding to the M cards.

4. The method of claim 1, wherein selecting (N−1) cards from the N cards comprises:
   selecting (N−1) cards from the N cards according to service statuses of the N cards.

5. The method of claim 4, wherein selecting (N−1) cards from the N cards according to service statuses of the N cards comprises:
   in response to determining that all the N cards are in a service idle state or all the N cards are processing a non-real-time service, randomly selecting (N−1) cards from the N cards.

6. The method of claim 4, wherein selecting (N−1) cards from the N cards according to service statuses of the N cards comprises:
   in response to determining that one of the N cards is performing a real-time service, selecting, from the N cards, (N−1) cards except the card which is performing the real-time service.

7. The method of claim 4, wherein selecting (N−1) cards from the N cards according to service statuses of the N cards comprises:
   in response to determining that one of the N cards is in a non-service idle state and the remaining (N−1) cards are in the service idle state, selecting the (N−1) cards in the service idle state from the N cards.

8. A non-transitory computer-readable storage medium comprising a computer program stored thereon which, when executed by a processor, causes the processor to carry out the information acquisition method of claim 1.

9. The method of claim 2, wherein selecting (N−1) cards from the N cards comprises:
   selecting (N−1) cards from the N cards according to service statuses of the N cards.

10. The method of claim 3, wherein selecting (N−1) cards from the N cards comprises:
    selecting (N−1) cards from the N cards according to service statuses of the N cards.

11. The method of claim 1, wherein the step of re-allocating GUTIs is triggered in a manner comprising at least one of:
    initiating a re-registration process,
    initiating a handover process, or
    initiating signaling related to mobility management to trigger the networks to update the GUTIs.

12. The method of claim 1, further comprising:
    in response to determining that paging identifiers corresponding to any two cards among the paging identifiers corresponding to the M cards are different from each other, ending the step of acquiring paging identifiers corresponding to M cards respectively from GUTIs allocated by networks corresponding to the M cards.

13. The method of claim 1, further comprising:
    in response to determining that the M cards are not camped on one and the same cell or the cell is not shared by operators corresponding to the M cards, ending the step of acquiring paging identifiers corresponding to M cards respectively from GUTIs allocated by networks corresponding to the M cards.

14. An electronic device, comprising:
    at least one processor; and
    a storage device storing at least one program which, when executed by the at least one processor, causes the at least one processor to carry out an information acquisition method, the information acquisition method comprising:
    acquiring paging identifiers corresponding to M cards respectively from global unique temporary user equipment identities (GUTIs) allocated by networks corresponding to the M cards; wherein M is an integer greater than or equal to 2; and
    in response to determining that paging identifiers corresponding to N cards among the paging identifiers corresponding to the M cards are the same, selecting (N−1) cards from the N cards and triggering networks corresponding to the selected (N−1) cards to re-allocate GUTIs; wherein N is an integer greater than or equal to 2 and less than or equal to M.

15. A terminal device, comprising:
    at least two card slots for accommodating cards;
    at least one processor; and
    a storage device storing at least one program which, when executed by the at least one processor, causes the at least one processor to carry out an information acquisition method, the information acquisition method comprising:

acquiring paging identifiers corresponding to M cards respectively from global unique temporary user equipment identities (GUTIs) allocated by networks corresponding to the M cards;
   wherein M is an integer greater than or equal to 2; and in response to determining that paging identifiers corresponding to N cards among the paging identifiers corresponding to the M cards are the same, selecting (N−1) cards from the N cards and triggering networks corresponding to the selected (N−1) cards to re-allocate GUTIs;
   wherein N is an integer greater than or equal to 2 and less than or equal to M.

\* \* \* \* \*